(12) United States Patent
Silva Zavalza et al.

(10) Patent No.: US 12,083,826 B2
(45) Date of Patent: Sep. 10, 2024

(54) VEHICLE WHEEL ASSEMBLY

(71) Applicant: NISSAN NORTH AMERICA, INC., Franklin, TN (US)

(72) Inventors: José Francisco Silva Zavalza, Aguascalientes (MX); Hugo Ahumada Medina, Jalisc (MX)

(73) Assignee: Nissan North America, Inc., Franklin, TN (US)

( * ) Notice: Subject to any disclaimer, the term of this patent is extended or adjusted under 35 U.S.C. 154(b) by 91 days.

(21) Appl. No.: 17/555,348

(22) Filed: Dec. 17, 2021

(65) Prior Publication Data
US 2023/0191831 A1  Jun. 22, 2023

(51) Int. Cl.
*B60B 7/16* (2006.01)
*F16B 41/00* (2006.01)

(52) U.S. Cl.
CPC .............. *B60B 7/16* (2013.01); *F16B 41/005* (2013.01)

(58) Field of Classification Search
CPC ................................. B60B 7/16; F16B 41/005
See application file for complete search history.

(56) References Cited

U.S. PATENT DOCUMENTS

| | | | | |
|---|---|---|---|---|
| 3,534,570 A * | 10/1970 | Mauro | ..................... | E05B 83/24 70/230 |
| 3,833,266 A * | 9/1974 | Lamme | ..................... | B60B 7/16 301/37.21 |
| 3,918,764 A * | 11/1975 | Lamme | ..................... | B60B 7/16 301/37.21 |
| 3,995,461 A * | 12/1976 | Hudson | ................... | B60B 7/068 70/225 |
| 4,161,869 A * | 7/1979 | Dixon | ....................... | B60B 7/16 301/37.21 |
| 4,825,669 A * | 5/1989 | Herrera | ..................... | B60B 7/16 70/232 |
| 5,097,686 A | 3/1992 | Plumer | | |
| 6,116,700 A * | 9/2000 | Herrera | ................... | B60B 3/147 70/225 |
| 7,392,674 B1 | 7/2008 | Grote | | |
| 7,673,482 B2 * | 3/2010 | Bosman | ..................... | B60B 7/16 70/225 |
| 8,739,585 B2 * | 6/2014 | Sims | ....................... | B60B 3/165 70/225 |
| 9,689,180 B2 * | 6/2017 | Ivarsson | .................. | E05B 77/44 |
| 10,112,436 B2 * | 10/2018 | Denmead | ................. | B60B 3/16 |
| 10,927,881 B2 * | 2/2021 | Carranco | ............ | F16B 23/0007 |
| 2008/0007109 A1 | 1/2008 | Lawson et al. | | |
| 2008/0041127 A1 * | 2/2008 | Xavier | ..................... | B62H 5/18 70/228 |
| 2008/0127691 A1 | 6/2008 | Castillo et al. | | |

(Continued)

FOREIGN PATENT DOCUMENTS

CN  201220574 Y  4/2009

*Primary Examiner* — Mark A Williams
(74) *Attorney, Agent, or Firm* — Global IP Counselors, LLP

(57) ABSTRACT

A vehicle wheel assembly includes a brake rotor and a wheel lock. The brake rotor has at least one of a plurality of studs and a plurality of threaded openings disposed at a rim. The brake rotor has a first lock opening that is spaced of the plurality of studs and the plurality of threaded openings. The wheel lock is received by the first lock opening when the wheel lock is installed to the brake rotor.

14 Claims, 7 Drawing Sheets

(56) References Cited

U.S. PATENT DOCUMENTS

| | | | |
|---|---|---|---|
| 2014/0137612 A1* | 5/2014 | Gresse | F16B 41/005 70/448 |
| 2014/0169910 A1* | 6/2014 | Winnie | F16B 39/12 411/222 |
| 2015/0143859 A1 | 5/2015 | Beck, Jr. | |
| 2019/0256043 A1* | 8/2019 | Price | B60B 7/16 |

* cited by examiner

US 12,083,826 B2

VEHICLE WHEEL ASSEMBLY

BACKGROUND

Field of the Invention

The present invention generally relates to a vehicle wheel assembly. More specifically, the present invention relates to a vehicle wheel assembly having a brake rotor and a rim.

Background Information

It has been known that when vehicles are parked in unguarded places, there is an increased risk of vehicle theft of the vehicles or parts of the vehicles. Vehicle rim anti-theft devices are desired, to the extent that they do not affect the appearance of the rim or interfere with normal safe driving.

SUMMARY

In view of the state of the known technology, one aspect of the present disclosure is to provide a vehicle wheel assembly comprises a brake rotor and a wheel lock. The brake rotor has at least one of a plurality of studs and a plurality of threaded openings disposed at a rim. The brake rotor has a first lock opening that is spaced of the plurality of studs and the plurality of threaded openings. The wheel lock is received by the first lock opening when the wheel lock is installed to the brake rotor.

In view of the state of the known technology, another aspect of the present disclosure is to provide a wheel lock for locking a rim to a brake rotor. The wheel lock comprises a threaded portion, a key hole and a main body. The threaded portion has a first end of the wheel lock. The key hole has a second end of the wheel lock that is opposite the first end. The main body extends between the threaded portion and the key hole. The main body has at least one lock tongue movable between an extended position and a retracted position. The main body further has a tool access portion.

In view of the state of the known technology, another aspect of the present disclosure is to provide a method for installing a run to a rotor. The method comprises threading a wheel lock to a brake rotor. The method further comprises aligning a lock opening of a rim to the wheel lock. The method further comprises mounting the rim to the brake rotor such that the wheel lock is received by the lock opening. The method further comprises locking the wheel lock to the rim using a key.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
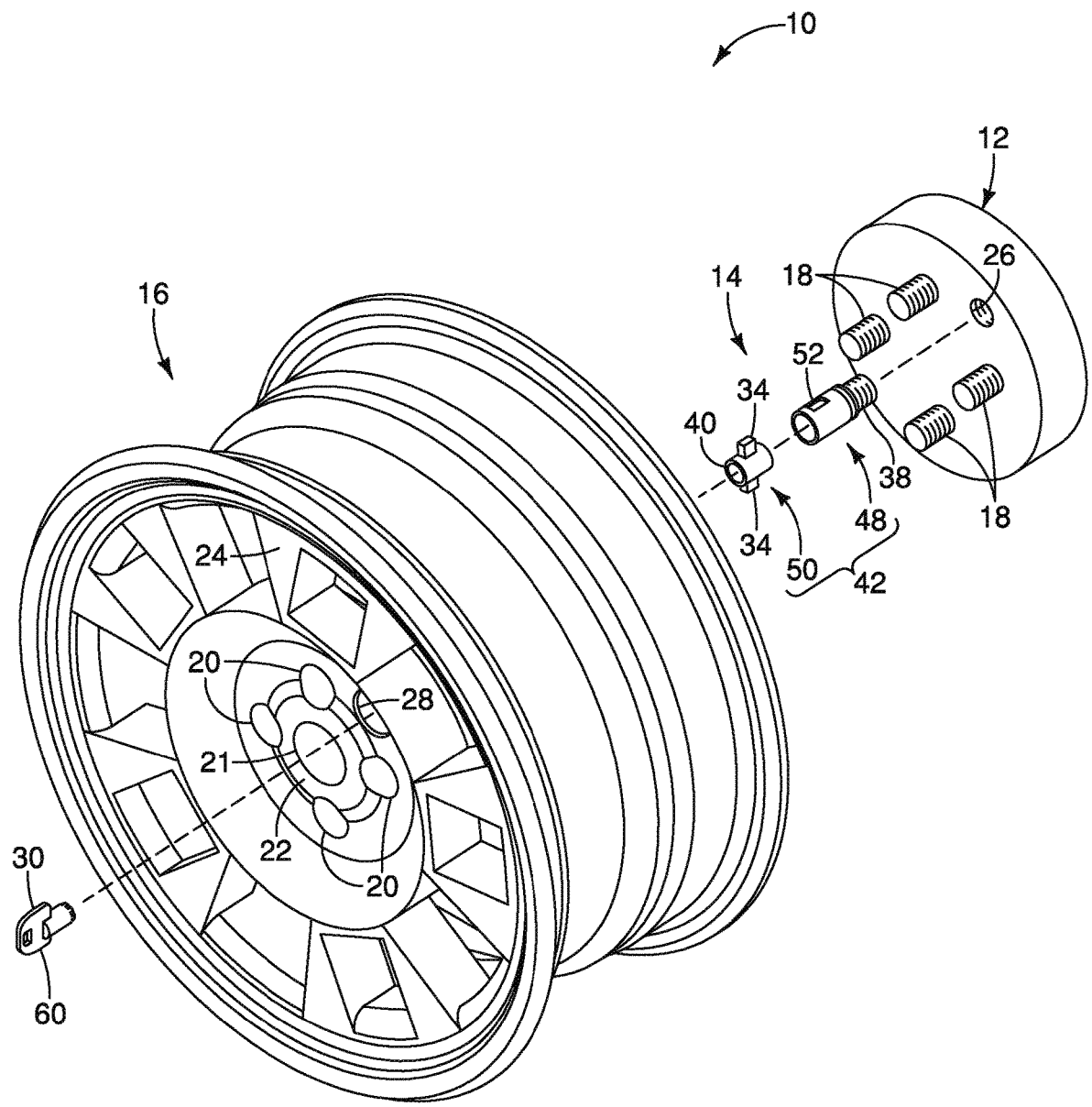
FIG. 1 is a front exploded perspective view of a vehicle wheel assembly in accordance with an illustrated embodiment.

Referring initially to FIG. 1, a vehicle wheel assembly 10 is illustrated in accordance with an embodiment. The vehicle wheel assembly 10 is configured to be provided to a vehicle (not shown). The vehicle wheel assembly 10 comprises a brake rotor 12 and a wheel lock 14. The vehicle wheel assembly 10 further comprises a rim 16 that is supported to the brake rotor 12, The vehicle wheel assembly 10 is configured to support a tire (not shown) that is mounted to the rim 16. The tire and the rim 16 together can be considered a wheel of the vehicle.

In the illustrated embodiment, the wheel lock 14 removably fixes or locks the rim 16 to the brake rotor 12. In particular, the wheel lock 14 is directly installed to the brake rotor 12 and is directly installed to the rim 16. The wheel lock 14 fixes the brake rotor 12 and the rim 16 with respect to each other. The wheel lock 14 of the illustrated embodiment is an anti-theft device provided to prevent unwanted taking of the rim 16 by fixing the rim 16 to the brake rotor 12 in such a way that the wheel lock 14 cannot be accessed by someone without a key.

Figure 2:
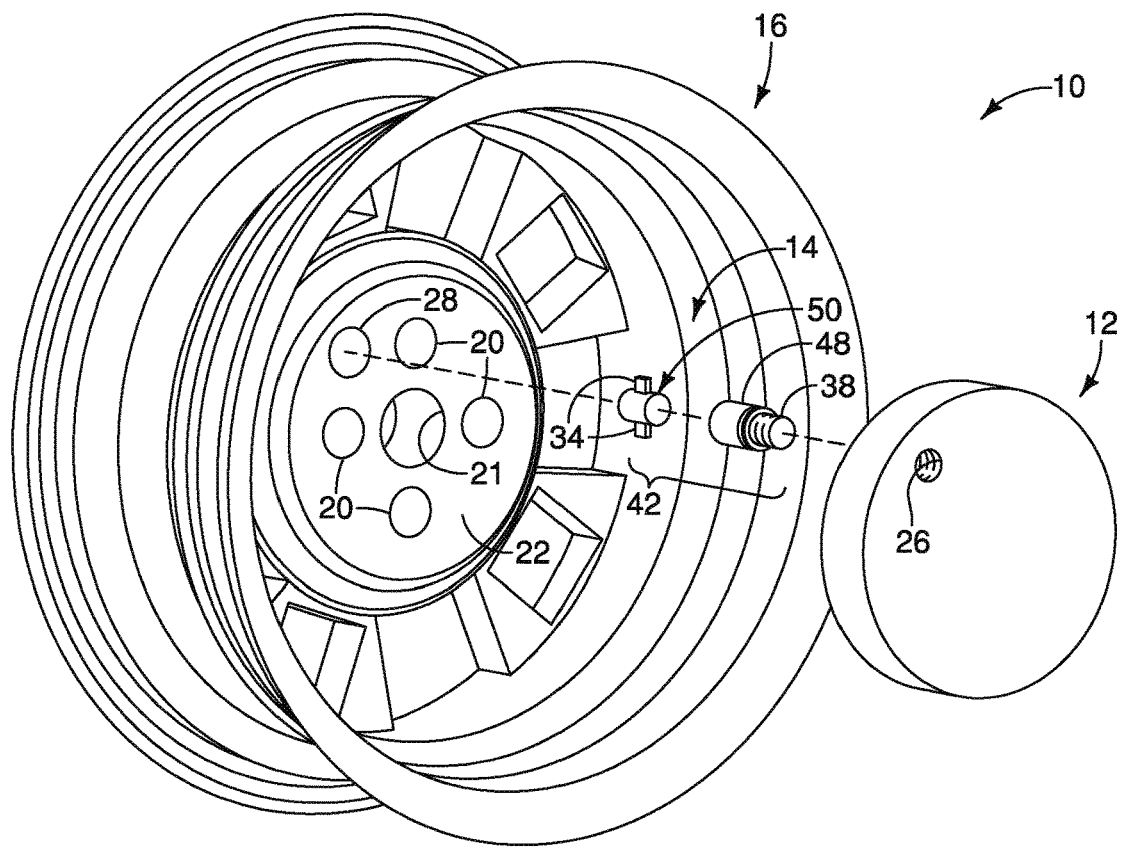
FIG. 2 is a rear exploded perspective view of the vehicle wheel assembly of FIG. 1.

Referring to FIGS. 1 and 2, the brake rotor 12 is a large metal disc installed to the interior of the rim 16, The brake rotor 12 is fixed to the rim 16 by a wheel axle (not shown). The brake rotor 12 rotates with the rim 16 and the tire during use. When braking the vehicle, the vehicle's brake pad clamps down on the brake rotor 12 to brake the vehicle. As shown, the brake rotor 12 includes a plurality of studs 18 protruding from the brake rotor 12 towards the rim 16 in order to attach the brake rotor 12 to the rim 16. In particular, the studs 18 are received by the rim 16 and attached to the rim 16 by lug nuts (not shown) that screw over the studs 18.

It will be apparent to those skilled in the vehicle field from this disclosure that while the brake rotor 12 is illustrated as including a plurality of studs 18, the brake rotor 12 can alternatively be compatible with lug bolts for installing the brake rotor 12 to the rim 16. In particular, the brake rotor 12 can alternatively include a plurality of openings (e.g., threaded openings) to receive a plurality of lug bolts (not shown) that directly attach the brake rotor 12 to the rim 16. Therefore, the brake rotor 12 of the illustrated embodiment includes at least one of a plurality of studs 18 and a plurality of threaded openings that are to be supported to a rim 16.

The brake rotor 12 includes a set of four studs 18 that are arranged in a circular pattern on the brake rotor 12. The studs 18 are received by corresponding stud openings 20 on the rim 16. As stated, the rim 16 is supported to the brake rotor 12. In the illustrated embodiment, the rim 16 is supported to the brake rotor 12 by the studs 18 and secured therein by lug nuts. Alternatively, the rim 16 can be supported to the brake rotor 12 by lug bolts, as described above. In particular, the rim 16 includes a hub 22 that includes a plurality of stud openings 20 that are arranged around a central opening 21 that receives the wheel axle therethrough. The rim 16 further includes a plurality of spokes 24 extending radially from the hub 22 to the tire.

The rim 16 has the stud openings 20 for engaging the brake rotor 12. The stud openings 20 receive the studs 18 of the brake rotor 12 and also the lug nuts that secure the brake rotor 12 to the rim 16. The stud openings 20 of the rim 16 are arranged to correspond with the studs 18 of the brake rotor 12 such that the stud openings 20 and the studs 18 are aligned to install the rim 16 to the brake rotor 12. As shown, the rim 16 includes a set of four stud openings 20 that are arranged in a circular pattern on the rim 16. However, it will be apparent to those skilled in the vehicle field from this disclosure that the brake rotor 12 and the rim 16 can include different numbers of studs 18 and stud openings 20 as needed and/or required.

As seen in FIGS. 1 and 2, the brake rotor 12 has a first lock opening 26 that is spaced of the plurality of studs 18. (If the brake rotor 12 is compatible with lug bolts instead of lug nuts, then the first lock opening 26 would be spaced of the plurality of threaded openings for the lug bolts.) That is, the studs 18 are arranged in a circular arrangement and the first lock opening 26 is arranged offset of the circular arrangement of studs 18. The first lock opening 26 is a threaded opening. For example, the brake rotor 12 can be drilled to have an opening and tapped to create threads in the opening. The wheel lock 14 is threaded to the first lock opening 26, as will he further discussed below.

Figure 4:
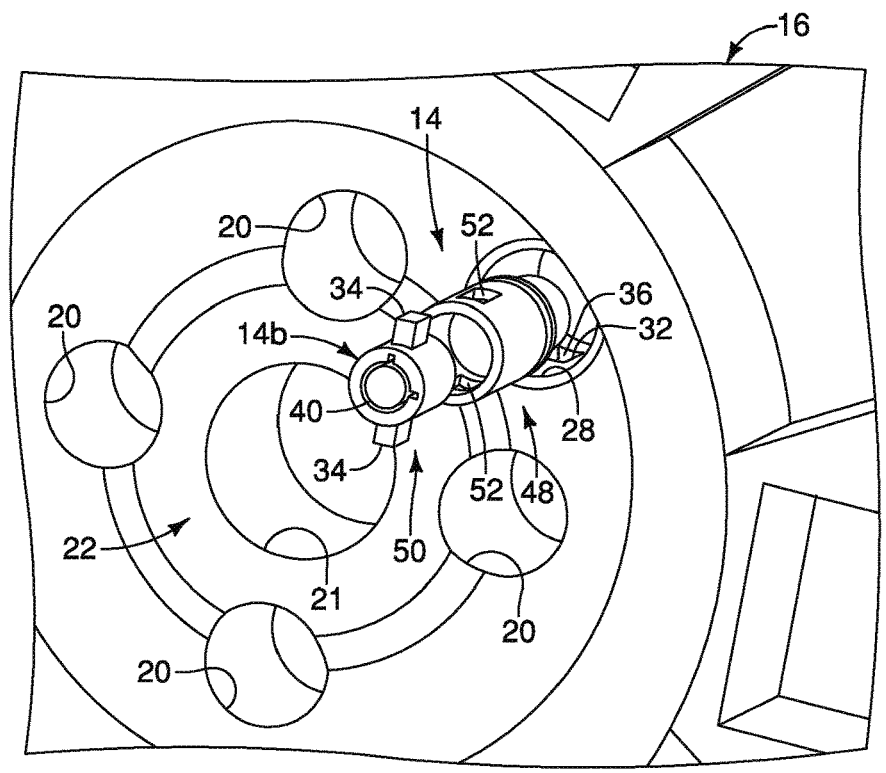
FIG. 4 is an enlarged exploded view of the wheel lock with respect to the rim of FIG. 3.

The rim 16 has a second lock opening 28, as best seen in FIG. 4. The second lock opening 28 is spaced of the stud openings 20 of the rim 16. That is, the stud openings 20 are arranged in a circular arrangement and the second lock opening 28 is arranged offset of the circular arrangement of stud openings 20. The wheel lock 14 is removably arranged within the second lock opening 28. In particular, the wheel lock 14 includes a key 30 as seen in FIG. 1. The key 30 locks and unlocks the wheel lock 14 to the second lock opening 28. as will be further discussed below. In this way, the rim 16 can be easily removed from the wheel lock 14 by unlocking the wheel lock 14. While the second lock opening 28 is illustrated as being circular, it will be apparent to those skilled in the vehicle field from this disclosure that the second lock opening 28 can have different shapes, such as a square or a rectangular shape as needed and/or desired.

Referring to FIGS. 3 to 7, the second lock opening 28 includes at least one hidden surface 32 for receiving the wheel lock 14 when the wheel lock 14 is in the locking position. In particular, wheel lock 14 includes at least one lock tongue 34 moving between a rest and a lock position. The second lock opening 28 receives the at least one lock tongue 34 when the lock tongue 34 is in the locking position, as will be further described below. In the illustrated embodiment, a "hidden surface" is defined as a surface that lies behind the exterior walls of the rim 16 such that the hidden surface 32 is not visible to the user.

In particular, the second lock opening 28 has a pair of receptacles 36 formed inside the exterior wall of the hub 22 that receive a pair of lock tongues 34 of the wheel lock 14 when the wheel lock 14 is locked to the rim 16, as will be described below. That receptacles 36 include a plurality of hidden surfaces 32 of the second lock opening 28. While the second lock opening 28 is illustrated as including a pair of oppositely extending receptacles 36, it will be apparent to those skilled in the vehicle field from this disclosure that the second lock opening 28 can include only a single receptacle or additional receptacles 36 that include hidden surfaces 32 as needed and/or desired.

Conventionally, the rim 16 and the brake rotor 12 are secured by lug nuts that are threaded to the studs 18. The lug nuts are relatively easy to remove using conventional tools. However, with the wheel lock 14 of the illustrated embodiment, the rim 16 is locked to the brake rotor 12 via the wheel lock 14. That is, the wheel lock 14 is directly attached to the rotor (by threading) and is directly latched to the rim 16 by operating the key 30. When the wheel lock 14 is threaded into the brake rotor 12, a main body 42 of the wheel lock 14 protrudes from the brake rotor 12. The rim 16 is then mounted the brake rotor 12 such that the unthreaded portion 38 of the wheel lock 14 is received by the second lock opening 28. In this way, the brake rotor 12 and the rim 16 can be locked to each other using the wheel lock 14.

Figure 3:
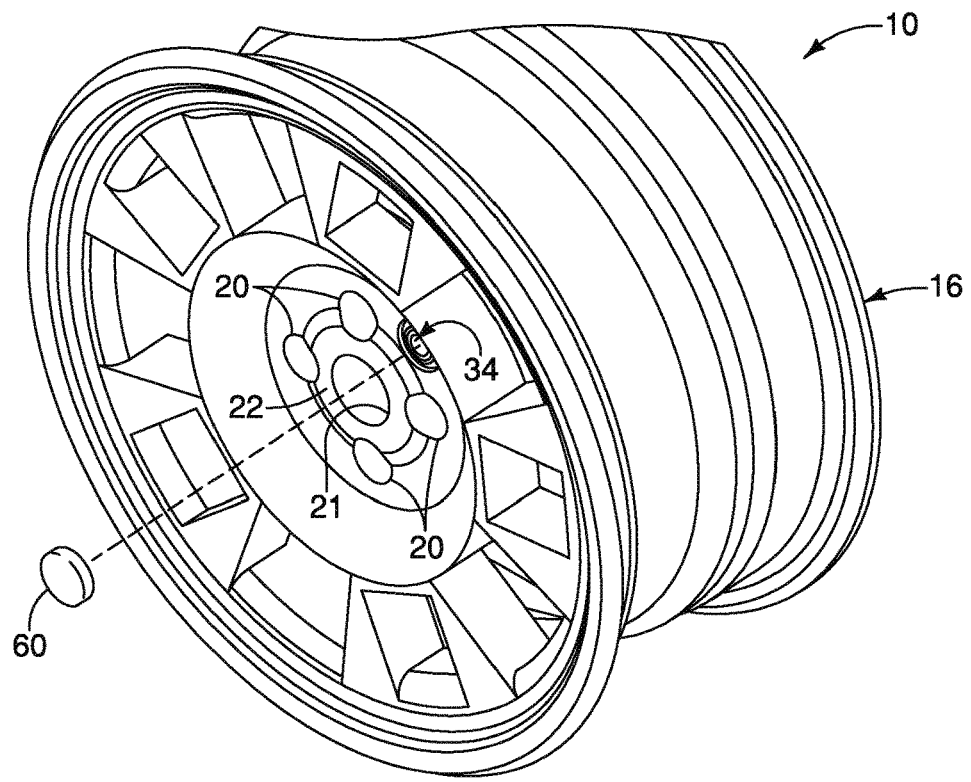
FIG. 3 is a front perspective view of a wheel lock of the vehicle wheel assembly assembled to a rim of the vehicle wheel assembly.
Figure 8:
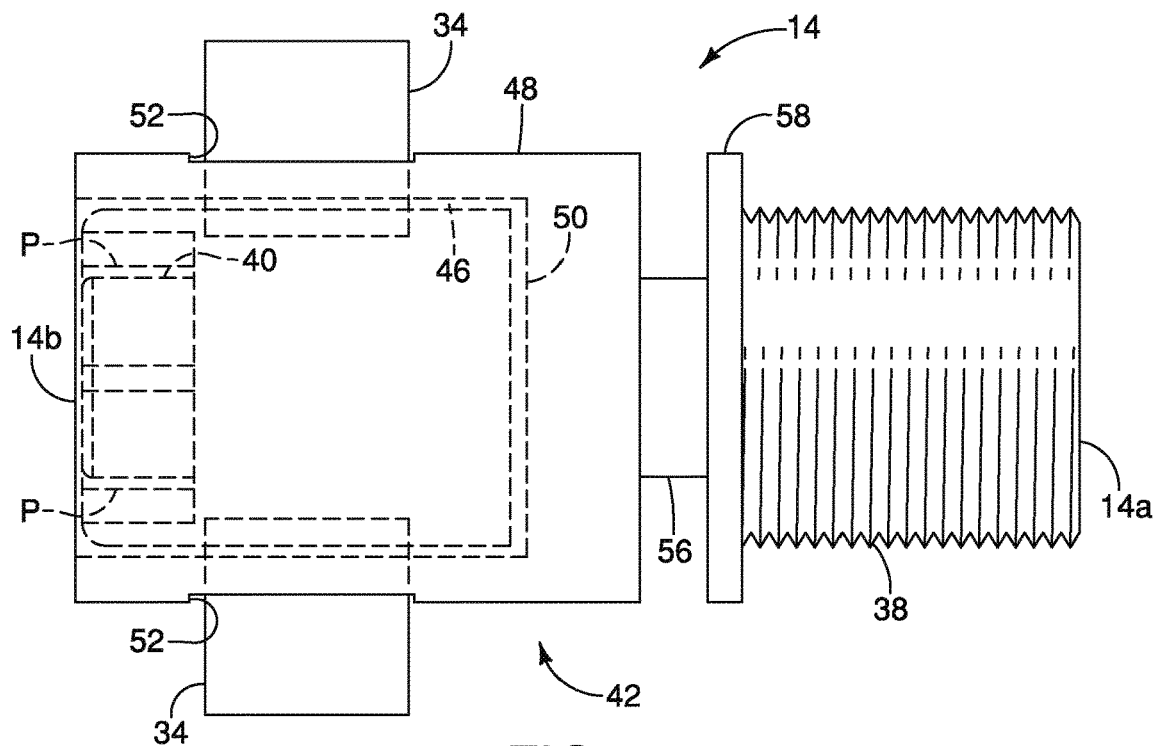
FIG. 8 is a side elevational view of the wheel lock.
Figure 9:
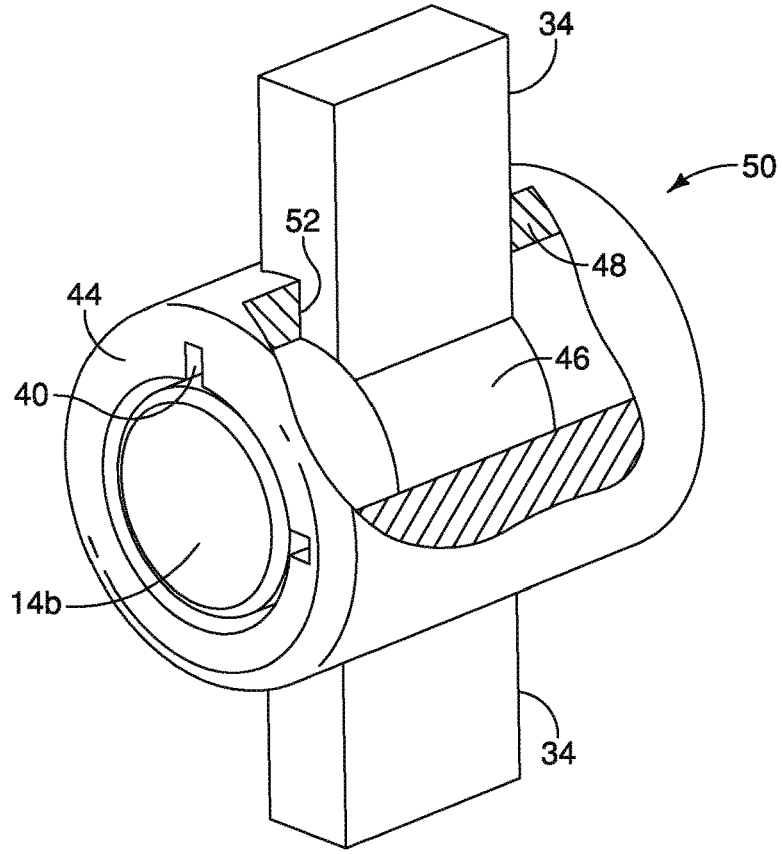
FIG. 9 is a front perspective view of a portion of the wheel lock having a cutaway.
Figure 10:
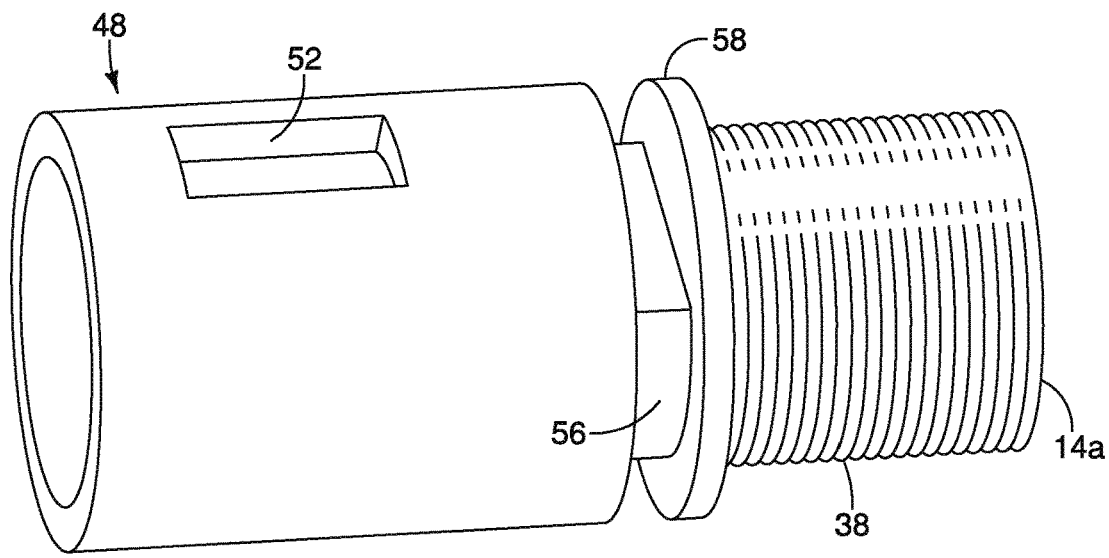
FIG. 10 is a front perspective view of another portion of wheel lock.
Figure 11:
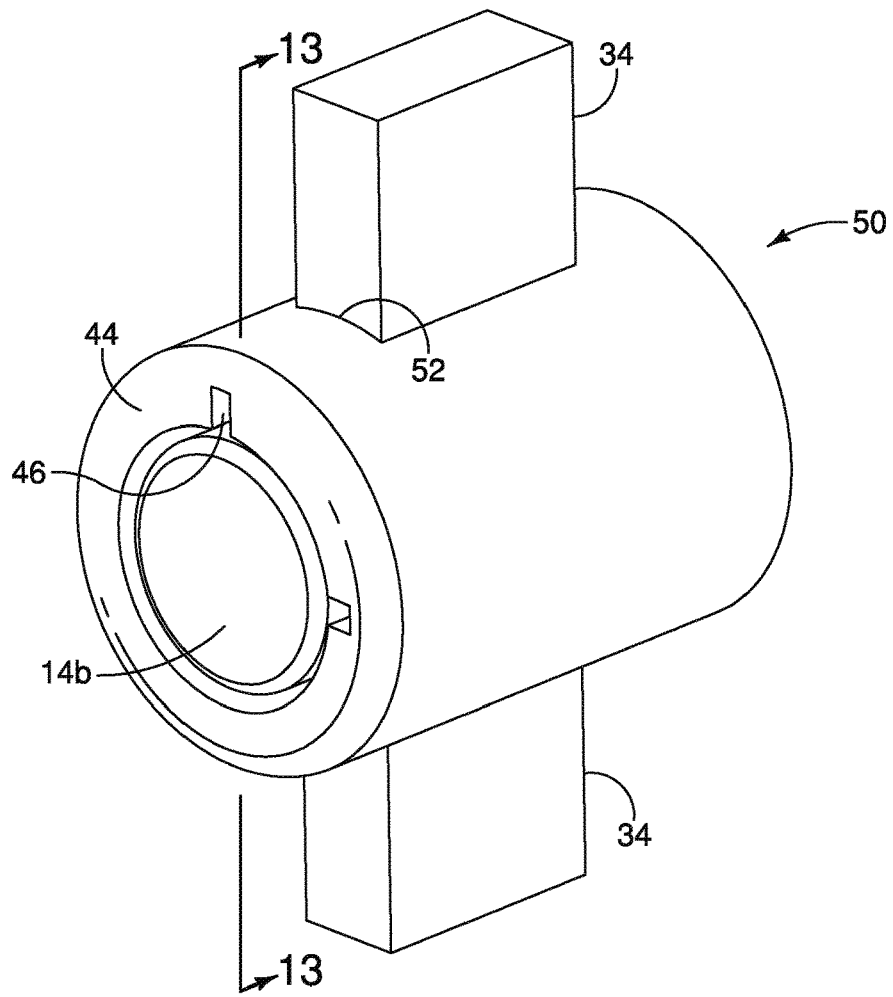
FIG. 11 is a front perspective view of the portion of the wheel lock of FIG. 9 without the cutaway.

Referring to FIGS. 8 to 11, the wheel lock 14 comprises a threaded portion 38, a key hole 40 and the main body 42. The threaded portion 38 has a first end of the wheel lock 14. The key hole 40 has a second end of the wheel lock 14 that is opposite the first end. In other words, the key hole 40 and the threaded portion 38 are disposed on opposite ends of the wheel lock 14. As seen in FIGS. 3, 9 and 11, the wheel lock 14 further includes an end surface 44 that has the key hole 40. In the illustrated embodiment, the end surface 44 has an outer circumference substantially equal to an outer circumference of the second lock opening 28 when the wheel lock 14 is installed to the rim 16. Thus, the end surface 44 has the key hole 40 that is configured to receive the key 30.

The key 30 is received by the key hole 40. The key 30 is inserted through the key hole 40 to access a cam 46 of the wheel lock 14 in order to operate the lock tongues 34, as will be discussed below. As shown in FIGS. 1 and 9, the key 30 for the wheel lock 14 is inserted through the key hole 40 to operate the cam 46 that is a core of the wheel lock 14 that rotates to push and pull the lock tongues 34 into and out of engagement with the receptacles 36 of the second lock opening 28. The key 30 and the key hole 40 can operate together similar to a pin tumbler lock. That is the wheel lock 14 can include a plurality of pins P arranged in a circular pattern around the key hole 40 that operatively engage the key 30 to operate the wheel lock 14 when the key 30 is turned.

The main body 42 extends between the threaded portion 38 and the key hole 40. As stated, the wheel lock 14 is received by the first lock opening 26 when the wheel lock 14 is installed to the brake rotor 12. The threaded portion 38 of the wheel lock 14 is threaded to the brake rotor 12. The wheel lock 14 is threaded to the first lock opening 26 and is not threaded to the second lock opening 28.

The main body 42 of the wheel lock 14 is received by the second lock opening 28. As best seen in FIG. 9, the main body 42 has at least one lock tongue 34 movable between an extended position and a retracted position. That is, the wheel lock 14 is movable between a rest position (FIG. 6) and a locked position (FIG. 7), The wheel lock 14 is not latched to the rim 16 when in the rest position. Therefore, the rest position of the wheel lock 14 is an unlocked position. Rather, the wheel lock 14 is slidable with respect to the lock opening when in the rest position so that the wheel lock 14 can be removed by a user.

The wheel lock 14 is fixedly engaged with the second lock opening 28 of the rim 16 when in the lock position, as will he described below. In this way, the wheel lock 14 is received by the first and second lock openings 26 and 28 when the wheel lock 14 is installed to the rim 16 and the brake rotor 12. Alternatively speaking, the wheel lock 14 extends through the rim 16 to engage the brake rotor 12.

Figure 6:
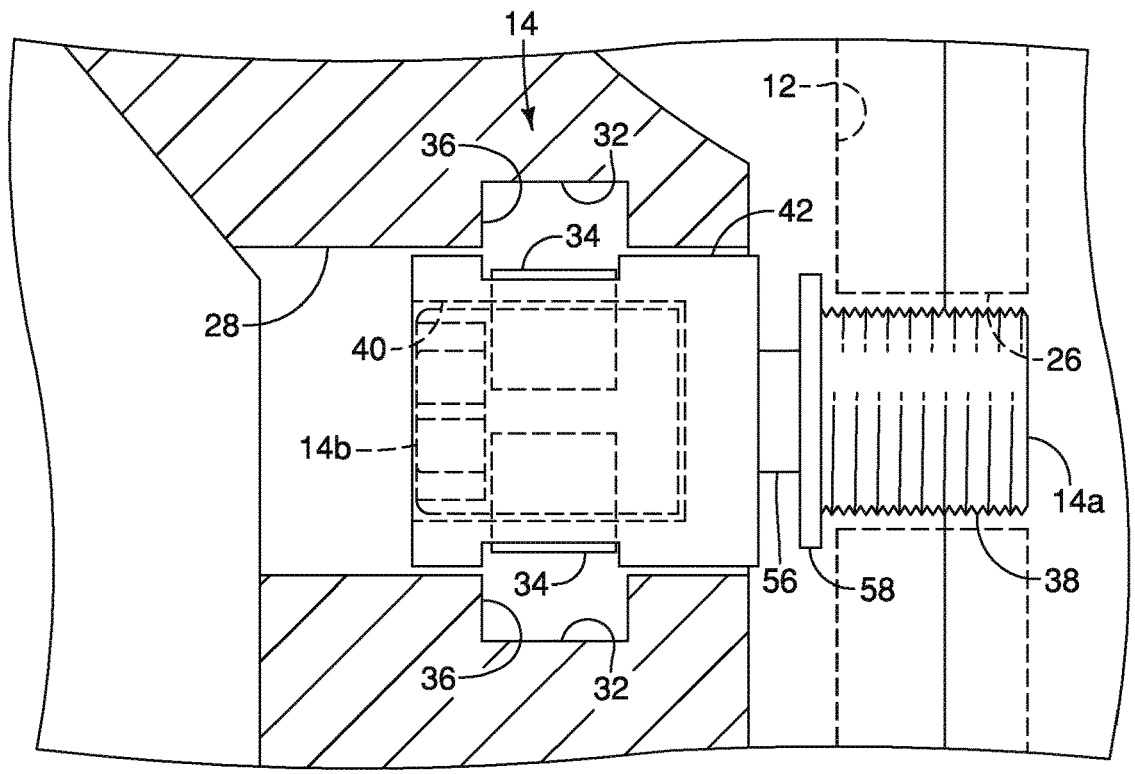
FIG. 6 is an enlarged partial side cross-sectional view similar to FIG. 5 but with the wheel lock in a rest position.
Figure 7:
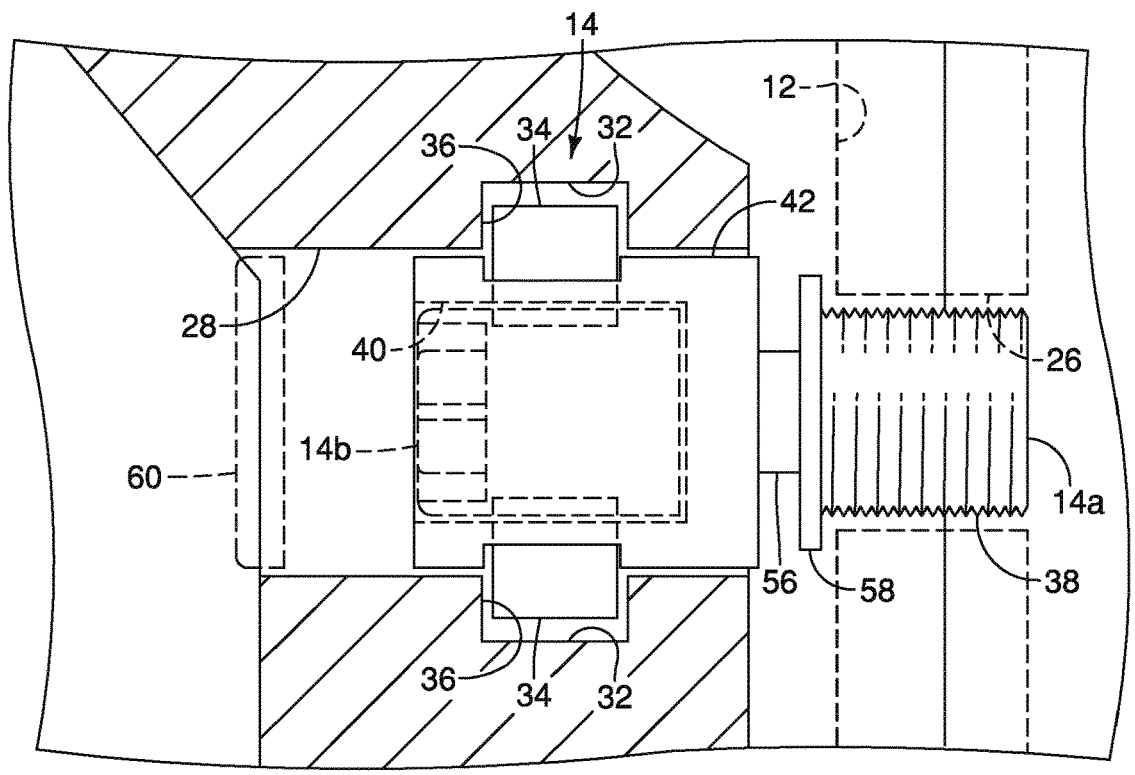
FIG. 7 is an enlarged partial side cross-sectional view similar to FIG. 6 but with the wheel lock in a locked position.
Figure 12:
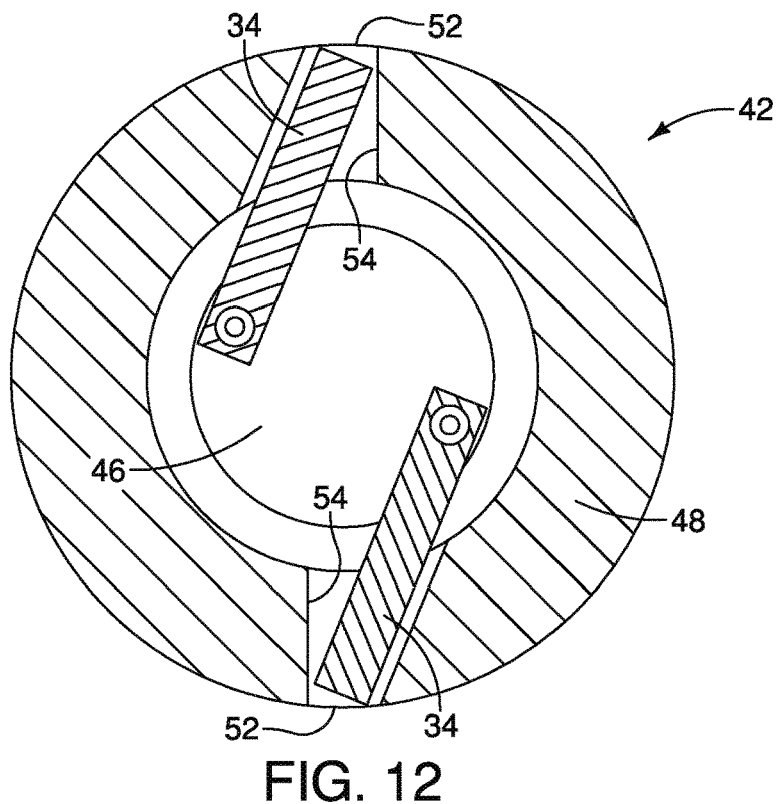
FIG. 12 is a cross-sectional view of the wheel lock taken along lines 13-13 of FIG. 11 but with the wheel lock in the rest position.
Figure 13:
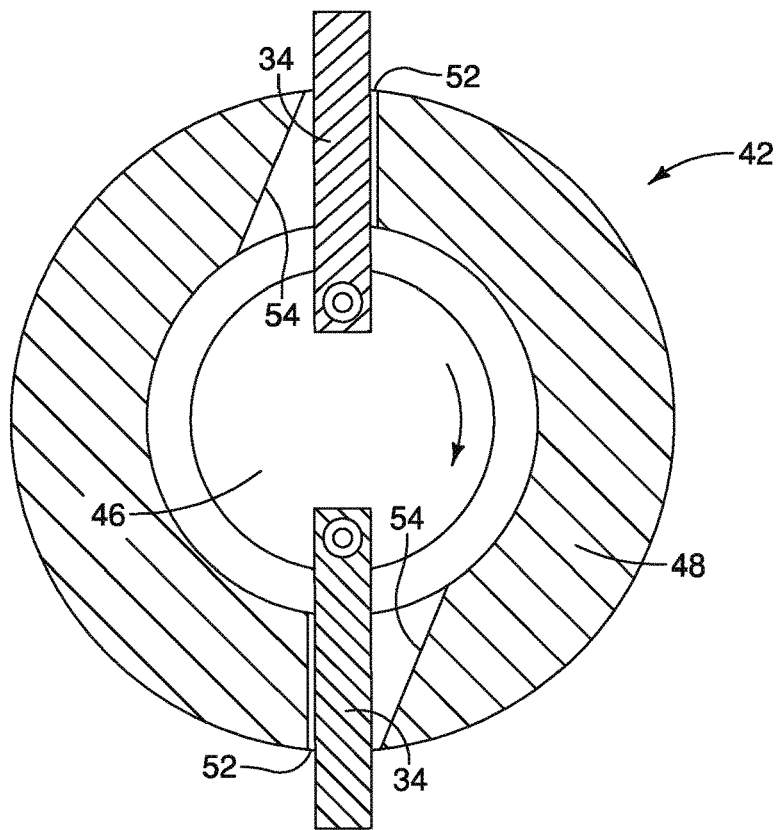
FIG. 13 is a cross-sectional view of the wheel lock taken along lines 13-13 of FIG. 11.

As best seen in FIGS. 10 and 11, the main body 42 includes a cylindrical housing 48 and a latching part 50. The latching part 50 includes the lock tongues 34 that engage the receptacles 36 of the second lock opening 28. That is, the wheel lock 14 includes the pair of lock tongues 34 that are movable between the locking position and the rest position. The lock tongues 34 are retracted in the rest position, as seen in FIGS. 6 and 12. The lock tongues 34 are extended in the locking position, as seen in FIGS. 7 and 13. The lock tongues 34 fixedly engage the second lock opening 28 when in the locking position, as seen in FIG. 7. The latching part 50 is received into the cylindrical housing 48 and is movable with respect to the cylindrical housing 48.

The cylindrical housing 48 includes a pair of openings 52 for receiving the lock tongues 34. The lock tongues 34 extend through the openings 52 of the of the cylindrical housing 48 when the wheel lock 14 is in the locked position, as seen in FIG. 13. The lock tongues 34 are retracted from the openings 52 when the wheel lock 14 is in the rest position, as seen in FIG. 12. It will be apparent to those skilled in the vehicle field from this disclosure that the wheel lock 14 can include only one or additional ones of the lock tongues 34 for engaging the receptacles 36 of the second lock opening 28. Also, the cylindrical housing 48 and the latching part 50 are illustrated as being two separate parts. However, it will be apparent to those skilled in the vehicle field from this disclosure that the cylindrical housing 48 and the latching part 50 are provided as a single member with the cylindrical housing 48 and the latching part 50 being movable with respect to each other.

Referring to FIGS. 9 and 11 to 13, the latching part 50 includes the cam 46. The cam 46 defines the core of the wheel lock 14 that is operable by the key 30. The user rotates the key 30 to move the lock tongues 34 between the locking position and the rest position. The cam 46 is rotatable within the cylindrical housing 48 to operate the lock tongues 34. In particular, the lock tongues 34 are pivotally attached to the cam 46 so to move with the cam 46 when the cam 46 is operated by the key 30. The key 30 is operable to move the lock tongue 34 between the extended position and the retracted position.

As best seen in FIGS. 12 and 13, the latching part 50 includes a pair of latch slots 54 that correspond to each of the lock tongues 34. The latch slots 54 extend from the cam 46 and lead to the openings of the cylindrical housing 48 so that the lock tongues 34 extend through the latch slots 54 and can extend through the openings when in the locking position. As shown, the latch slots 54 are slanted such that the lock tongues 34 are slanted within the latch slots 54 when in the rest position, as seen in FIG. 12. The lock tongues 34 preferably extend through the latch slots 54 substantially vertically when in the locking position, as seen in FIG. 13.

As seen in FIGS. 8 and 10, the main body 42 further has a tool access portion 56. The tool access portion 56 is positioned between the first and second lock openings 26 and 28 when the wheel lock 14 is installed to the rim 16 and the brake rotor 12, as seen in FIGS. 6 and 7. In the illustrated embodiment, the tool access portion 56 preferably includes angled surfaces configured to engage a wrench or some other tool for tightening the wheel lock 14 into the first lock opening 26.

That is, the user can use a wrench at the tool access portion 56 to thread the wheel lock 14 to the brake rotor 12. The tool access portion 56 is defined by the angled surfaces extending between the threaded portion 38 and the main body 42 of the wheel lock 14. In the illustrated embodiment, the tool access portion 56 is a hidden tool surface that cannot be accessed by a user once the wheel lock 14 is installed to the rim 16 and the brake rotor 12. That is, the wheel lock 14 is configured to be unable to be accessed by a tool once the wheel lock 14 is installed to the rim 16 and the brake rotor 12.

Figure 5:
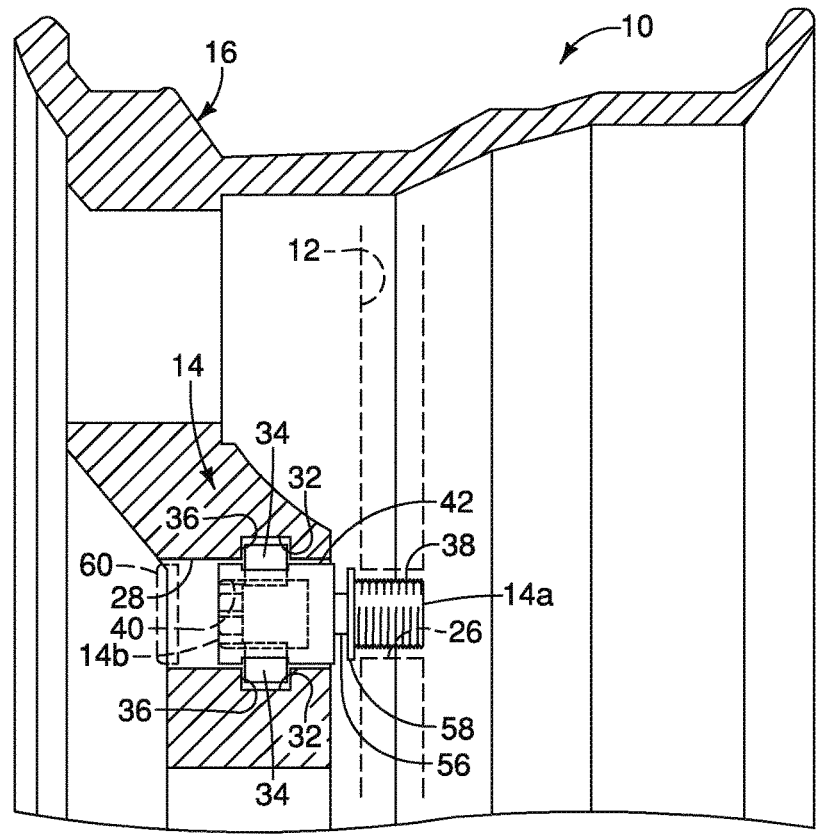
FIG. 5 is a partial side cross-sectional view of the wheel lock installed to the rim and a brake rotor of the vehicle wheel assembly.

As seen in FIGS. 8 and 10, the main body 42 further includes an annular flange 58 that separates the tool access portion 56 and the threaded portion 38. The annular flange 58 serves as a washer for stopping the threading of the wheel lock 14 into first lock opening 26. As seen in FIGS. 3 and 7, the wheel lock 14 preferably further includes a cover 60 for covering the key hole 40 once the wheel lock 14 is installed to the brake rotor 12 and the rim 16. As seen in FIGS. 5 to 7, the wheel lock 14 is preferably disposed partway into the exterior wall of the hub 22 to sit in the second lock opening 28. As shown, the cover 60 can be disposed over the second lock opening 28 so that the wheel lock 14 can be concealed. The cover 60 can be a magnetic cover or a rubber plug with a magnetic back having a color that is similar to the color of the rim 16 so that it is not noticeable.

A method of installing the wheel lock 14 can include drilling the first lock opening 26 to the brake rotor 12 offset of the studs 18. The method can further include tapping the hole to form threads. The method further includes threading the wheel lock 14 to the first lock opening 26 of the brake rotor 12. The method further includes aligning the second lock opening 28 of the rim 16 to the wheel lock 14. In particular, the main body 42 of the wheel lock 14 protrudes from the brake rotor 12 after being threaded into the first lock opening 26. So the method further includes aligning the main body 42 to the second lock opening 28. The method further includes mounting the rim 16 to the brake rotor 12 such that the wheel lock 14 is received by the second lock opening 28. The method further includes locking the wheel lock 14 to the rim 16 using the key 30. The lock tongues 34 engage the receptacles 36 of the second lock opening 28 when the wheel lock 14 is locked. The method can further include inserting the cover over the second lock opening 28 to conceal the wheel lock 14. To change the tire, the user unlocks the wheel lock 14 using the key 30 so that the rim 16 can be removed to change the tire.

GENERAL INTERPRETATION OF TERMS

In understanding the scope of the present invention, the term "comprising" and its derivatives, as used herein, are intended to be open ended terms that specify the presence of the stated features, elements, components, groups and/or steps, but do not exclude the presence of other unstated features, elements, components, groups and/or steps. The foregoing also applies to words having similar meanings such as the terms, "including". "having" and their derivatives. Also, the terms "part," "section," "portion." "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle wheel assembly. Accordingly, these terms, as utilized to describe the present invention should be interpreted relative to a vehicle equipped with the vehicle wheel assembly.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied h such feature(s). Thus, the foregoing descriptions of the embodiments according to the present invention are provided for illustration only, and not for the purpose of limiting the invention as defined by the appended claims and their equivalents.

What is claimed is:

1. A vehicle wheel assembly, comprising:
   a brake rotor configured to engage at least one brake pad of a vehicle for braking the vehicle, the brake rotor having at least one of a plurality of studs and a plurality of threaded openings, the at least one of the plurality of studs or the plurality of threaded openings being configured to be supported to a rim of the vehicle wheel assembly, the brake rotor further having a first lock opening that is separate of and spaced away from of the plurality of studs or the plurality of threaded openings; and
   a wheel lock for locking the rim to the brake rotor, the wheel lock received by the first lock opening when the wheel lock is installed to be engaged with the brake rotor, the wheel lock having at least one lock tongue that is movable relative to a main body of the wheel lock between a rest position and a locking position, the lock tongue being retracted relative to the main body in the rest position and being radially extended relative to the main body with respect to a center axis of the wheel lock when in the locking position to be received and engaged by a second lock opening within the rim so as to lock the rim to the brake rotor when the tongue is in the locking position and to release the rim from the brake rotor when the tongue is in the rest position.

2. The vehicle wheel assembly according to claim 1, further comprising
   the rim to be supported to the brake rotor, the rim having the second lock opening, the wheel lock being received by the first and second lock openings when the wheel lock is installed to the rim and the brake rotor.

3. The vehicle wheel assembly according to claim 2, wherein
   the wheel lock is threaded to the first lock opening and is not threaded to the second lock opening.

4. The vehicle wheel assembly according to claim 1, wherein
   the second lock opening includes at least one hidden surface for receiving the lock tongue when the lock tongue is in the locking position, the at least one hidden surface being a surface that lies behind exterior walls of the rim such that the at least one hidden surface is not visible to the user.

5. The vehicle wheel assembly according to claim 4, wherein
   the wheel lock includes a tool access portion for engaging a user tool, the tool access portion being positioned between the first and second lock openings when the wheel lock is installed to the rim and the brake rotor.

6. The vehicle wheel assembly according to claim 5, wherein
   the wheel lock further includes an end surface having a key hole, the end surface having an outer circumference substantially equal to an outer circumference of the second lock opening when the wheel lock is installed to the rim.

7. The vehicle wheel assembly according to claim 1, further comprising
   the rim having a plurality of stud openings for engaging the brake rotor, the rim further having a lock opening that is spaced from the stud openings,
   the wheel lock being movable between a rest position and a locked position, the wheel lock being slidable with respect to the lock opening when in the rest position, the wheel lock being fixedly engaged with the lock opening when in the lock position.

8. The vehicle wheel assembly according to claim 7, wherein
   the wheel lock is threaded to the brake rotor.

9. The vehicle wheel assembly according to claim 8, wherein
   the lock tongue fixedly engages the lock opening of the rim when in the locking position.

10. The vehicle wheel assembly according to claim 9, wherein
    the wheel lock includes a tool access portion positioned between the rim and the brake rotor when the wheel lock is installed to the rim and the brake rotor.

11. The vehicle wheel assembly according to claim 10, wherein
    the wheel lock further includes an end surface having a key hole, the end surface having an outer circumference substantially equal to an outer circumference of the lock opening when the wheel lock is installed to the rim.

12. A wheel lock for locking a rim to a brake rotor of a vehicle wheel assembly, the wheel lock being configured to be received by a first lock opening in the brake rotor when the wheel lock is installed to the brake rotor for locking the rim to the brake rotor, the wheel lock comprising:
    a threaded portion formed at a first end of the wheel lock for threadedly engaging the brake rotor;

a key hole formed at a second end of the wheel lock that is opposite the first end for operably receiving a key; and a main body extending between the threaded portion and the key hole, the main body having at least one lock tongue movable relative to the main body between an extended position that is configured to be a locked position of the main body to the rim and a retracted position that is configured to be a rest position in which the main body is movable with respect to the rim, the main body further having a tool access portion for engaging a user tool for tightening the wheel lock into the first lock opening or loosening the wheel lock from the first lock opening, wherein the wheel lock is configured such that a user can lock and unlock the wheel lock to a second lock opening of the rim by operating the key to move the at least one lock tongue between the locked position and the rest position.

13. The wheel lock according to claim 12, further comprising the key to be received by the key hole, the key being operable to move the lock tongue between the extended position and the retracted position.

14. A method for installing a rim to a brake rotor of a vehicle wheel assembly, the wheel lock being configured to be received by a first lock opening in the brake rotor when the wheel lock is installed to the brake rotor for locking the rim to the brake rotor, the method comprising:

threading a wheel lock to the brake rotor;

aligning a lock opening of the rim to the wheel lock;

mounting the rim to the brake rotor such that the wheel lock is received by the lock opening; and locking the wheel lock to the rim by operating a key, the wheel lock having at least one lock tongue that is movable relative to the main body between a rest position in which the main body is movable with respect to the rim and a locking position of the main body to the rim, the lock tongue being retracted in the rest position and being radially extended with respect to a center axis of the wheel lock when in the locking position to be received and engaged by the lock opening, wherein operating the key moves the at least one lock tongue between the locking position and the rest position.

* * * * *